United States Patent

Uekusa et al.

[15] 3,679,949

[45] July 25, 1972

[54] SEMICONDUCTOR HAVING TIN OXIDE LAYER AND SUBSTRATE

[72] Inventors: Genzo Uekusa, Osaka; Shigeru Tanimura, Kyoto; Kazuhiro Higashi, Osaka; Takao Sumoto, Kyoto, all of Japan

[73] Assignee: Omron Tateisi Electronics Co., Ukyo-ku, Kyota, Japan

[22] Filed: Sept. 23, 1970

[21] Appl. No.: 74,561

[30] Foreign Application Priority Data

Sept. 24, 1969 Japan....................................44/76483
Sept. 26, 1969 Japan....................................44/77192

[52] U.S. Cl. ..............................................317/238, 317/233
[51] Int. Cl. ..........................................H01l 3/00, H01l 15/06
[58] Field of Search ..........................................317/238, 234

[56] References Cited

UNITED STATES PATENTS

| | | | |
|---|---|---|---|
| 2,556,991 | 6/1951 | Teal | 317/235 X |
| 3,053,926 | 9/1962 | Ben-Sira et al. | 136/89 |
| 3,104,188 | 9/1963 | Moncrieff-Yeates | 136/89 |
| 3,267,317 | 8/1966 | Fischer | 313/108 |
| 3,290,175 | 12/1966 | Cusano et al. | 136/89 |
| 3,330,983 | 7/1967 | Cusano et al. | 313/108 |
| 3,443,170 | 5/1969 | Pulvari | 317/234 |
| 3,560,812 | 2/1971 | Baertsch et al. | 317/234 |

*Primary Examiner*—James D. Kallam
*Attorney*—Irons, Sears, Staas, Halsey & Santorelli

[57] ABSTRACT

A semiconductor composite having a rectifying characteristic is provided by depositing a tin oxide film on a semiconductor substrate. In view of the fact that the tin oxide film has high transparency and conductivity the composite can be used as an excellent photoelectric device.

Preferably the tin oxide film is deposited on the substrate by reacting a halogenated organic tin compound with oxygen at an elevated temperature. Conductivity of the tin oxide film can be enhanced by incorporation of a small amount of antimony trichloride into the dimethyl tin dichloride. It was found that there are preferred reaction temperatures, time periods, and amount of mixed antimony trichloride for providing a composite having the desired characteristics. By depositing a plurality of separate tin oxide films on a single substrate by a photo-etching process of tin oxide film an integrated photoelectric apparatus is provided.

17 Claims, 33 Drawing Figures

INVENTOR
SHIGERU TANIMURA, KAZUHIRO HIGASHI,
GENZO UEKUSA, TAKAO SUMOTO

ATTORNEY

INVENTOR

BY Beniske Stas
Crenny & Halsey
ATTORNEY

INVENTOR

BY Burfisky, Staas, Breiner & Halsey

ATTORNEY

INVENTOR

BY Burfsky, Staas, Breiner, & Halsey

ATTORNEY

INVENTOR

BY Burfsky, Staas, Breiner & Halsey

ATTORNEY

INVENTOR

BY Bucknam, Stacey,
Bruce & Halsey
ATTORNEY

INVENTOR

BY

ATTORNEY

INVENTOR

BY Burfsky, Staas, Breiner & Halsey
ATTORNEY

SEMICONDUCTOR HAVING TIN OXIDE LAYER AND SUBSTRATE

BACKGROUND OF THE INVENTION

1. Field of the Invention

The present invention relates to a semiconductor device and a method of making. More specifically, the present invention relates to a semiconductor composite comprising a tin oxide film deposited on a semiconductor substrate and having a rectifying characteristic, and a process for manufacturing such composite.

2. Description of the Prior Art

Various types of photoelectric devices made of semiconductor materials have hitherto been proposed and put into practical use. One such device is a silicon photoelectric device, which is manufactured by forming a P-type (or N-type) diffused layer of a thickness of a few microns or less on the surface of an N-type (or P-type) silicon substrate so that when the light impinges on the PN junction formed therebetween, photo voltaic energy is generated between the P-type layer and the N-type layer.

However, this silicon pyotoelectric device is expensive to manufacture as compared with other types of photoelectric devices, such as cadmium sulfide photoelectric devices, mainly because manufacture of the silicon photoelectric devices, or silicon solar cells, necessitates a diffusion process which should be carried out at a high temperature and under delicately controlled conditions. On the other hand, in order to implement such a device having a spectral sensitivity similar to the human visual sensitivity characteristic, it is essential to make the above-mentioned diffused layer extremely thin, preferably as thin as 0.3 micron. Formation of such a thin diffused layer calls for a high level of diffusion technology, inevitably resulting in a high cost of this type of device. Moreover, such conventional devices must have an electrode for taking the photo voltaic energy. This electrode must be formed on the above-mentioned extremely thin diffused layer by a very complicated process, this being another reason for the high cost of this type of device.

The inability to make the diffused layer as thin as mentioned above results in insufficient sensitivity in a short wavelength region of spectral characteristic of this type of device and therefore limited the scope of application thereof.

If the diffused layer of the silicon photoelectric device could be replaced with a transparent and conductive film of metal oxide, and if such film could serve the same function as the diffused layer in such silicon photoelectric device, the cost of producing a photoelectric device could be greatly reduced and the resulting device would have a greater scope of application. For instance, a transparent conductive film of tin oxide or stannic oxide ($SnO_2$) has heretofore been in use for glassware decoration purpose. Recently this tin oxide film has found its applications in the field of electronics and is now being used as a material for transparent electrodes, resistors, etc.

The typical conventional method of depositing the tin oxide film utilizes the chemical reaction in which tin tetrachloride or stannic chloride ($SnCl_4$) is reacted with water ($H_2O$) at a high temperature on the surface of an object to yield tin oxide ($SnO_2$). More particularly, the deposition of such tin oxide film is being practiced by spraying an aqueous solution of stannic chloride over the surface of the object heated to a high temperature or by letting the vapor of such aqueous solution (vaporized at about 250°C) flow over the surface of the heated object positioned in a furnace or by dipping the heated object in such aqueous solution for a short time.

Assuming that a photoelectric device comprising the above-mentioned transparent metal oxide film deposited on a silicon substrate can be materialized, however, it may be readily appreciated that the above-mentioned conventional method of $SnO_2$ deposition would make the control of the thickness of deposited $SnO_2$ film difficult. Presently known deposition methods are not especially suitable for depositing thin films to make the above-mentioned type of photoelectric device. In addition, there are further problems relating to the electrode, packaging, and integration technique.

The present invention provides solutions for the above-mentioned problems.

SUMMARY OF THE INVENTION

In short, the present invention provides a composite comprising a film of a tin oxide, preferably stannic oxide ($SnO_2$), deposited on a semiconductor substrate and having a rectifying characteristic therebetween. Preferably the material of said semiconductor substrate may be selected from a group consisting of Si, Ge and GaAs. Such a composite with its $SnO_2$ layer as a light receiving side can be utilized as a photoelectrice device of a favorable photoelectric characteristic. Such a device is provided with a thin metallic film terminal formed on the $SnO_2$ layer. This thin metallic film terminal may preferably be provided by dep ositing a metal such as Ni on the preselected region either by evaporation or by sputtering, Ni being most preferred in view of its adhesion to the substrate.

The present invention also provides the process of manufacturing a semiconductor composite comprising a rectifying tin oxide film deposited on a semiconductor substrate by oxidizing a halogenated organic tin compound, preferably dimethyl tin dichloride or dimethyl stannous chloride ($(CH_3)_2SnCl_2$), on a semiconductor substrate heated to a high temperature to yield tin oxide, preferably $SnO_2$, on said substrate. Preferably a minute amount of antimony trichloride ($SbCl_3$) is mixed with $(CH_3)_2SnCl_2$ in the course of the above-mentioned process.

The temperature and time period of this reaction and the amount of $SbCl_3$ are quite important. Therefore, the present invention also provides such conditions of reaction as temperature, time period and the amount of $SbCl_3$ for providing a composite having maximum preferred characteristics.

The present invention also provides a method of manufacturing a composite chip comprising a tin oxide layer formed on a semiconductor substrate and having a rectifying characteristic therebetween, the said method comprising the steps of making a composite having a film deposited on a relatively broad area of the surface of a single substrate and severing said composite into a plurality of composite chips by scribing said composite. In accordance with the preferred embodiment of the present invention, the scribing is done, after a tin metal film has been deposited on the tin oxide layer of the composite. Further, the scribing is done from the side of the substrate opposite to the side on which tin oxide layer and thin metal film is formed. In accordance with the preferred embodiment of the present invention, the flaws in the rim of the composite chip resulting from scribing are removed by etching the side wall of the scribed composite chip. This etching remarkably improves the rectifying characteristic of the composite chip.

The present invention further provides a packaged photoelectric device prepared by packaging the composite chip in such a manner as to make the chip useful as a photoelectric device. Such packaged photoelectric device is prepared by sealing the photoelectric device with a transparent protective member attached to the light receiving side thereof with a synthetic resin molding. Said protective member is so dimensioned that its thickness provides a space enough for the electrode formed in the $SnO_2$ layer on the light receiving side of the element and also for the lead wire extending therefrom behind the element so that these can be so arranged as not to protrude out of the protective member.

The present invention also provides an integrated semiconductor composite comprising a plurality of $SnO_2$-semiconductor composites, each having a rectifying characteristic, integrated on a single semiconductor substrate.

Therefore, an object of the present invention is to provide a semiconductor composite of novel structure having a rectifying characteristic.

Another object of the present invention is to provide a semiconductor composite having a rectifying characteristic and comprising two layers, one of which is transparent and conductive.

Still another object of the present invention is to provide a semiconductor composite having a rectifying characteristic and comprising a transparent conductive film of tin oxide, preferably $SnO_2$ deposited on a semiconductor substrate.

A further object of the present invention is to provide a semiconductor photoelectric device comprising an $SnO_2$ layer deposited on a semiconductor substrate.

A still further object of the present invention is to provide a semiconductor photoelectric device with improved spectral sensitivity characteristic in the short wavelength region.

Still another object of the present invention is to provide a semiconductor photoelectric device of a high short circuit per unit area in low illumination.

It is another object of the present invention to provide a semiconductor photoelectric device having an excellent response characteristic.

It is a further object of the present invention to provide a semiconductor photoelectric device having excellent temperature characteristic.

It is still a further object of the present invention to provide a photoelectric device having an anti-reflection film on the light receiving side thereof.

It is still another object of the present invention to provide a photoelectric device which can be manufactured cheaply and with ease.

It is yet another object of the present invention to provide an $SnO_2$-Si composite photoelectric device comprising a silicon PN junction photoelectric device combined therewith.

Another object of the present invention is to provide a method of manufacturing an $SnO_2$-semiconductor composite having a good rectifying characteristic.

A further object of the present invention is to provide the method of manufacturing an $SnO_2$-semiconductor composite with a uniform $SnO_2$ film deposited thereon.

Still another object of the present invention is to provide the method of manufacturing an $SnO_2$-semiconductor composite comprising deposition of $SnO_2$ yielded through reaction of dimethyl tin dichloride ($(CH_3)_2SnCl_2$) with oxygen ($O_2$).

Yet another object of the present invention is to provide such reaction conditions as required for achieving the desired rectifying characteristic in the aforementioned manufacturing method.

Still a further object of the present invention is to provide the method of manufacturing an $SnO_2$-semiconductor composite chip.

Yet a further object of the present invention is to provide the method of manufacturing an $SnO_2$-semiconductor composite chip of an improved rectifying characteristic.

These and other objects and features of the present invention will be better understood from the following detailed description in conjunction with the accompanying drawings.

BRIEF DESCRIPTION OF THE DRAWINGS

In all these figures like numerals designate like parts.

DESCRIPTION OF THE PREFERRED EMBODIMENTS

Figure 1:
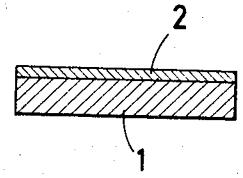
FIG. 1 is a sectional view of a semiconductor composite in accordance with the present invention.

Referring to FIG. 1, there is shown a sectional view of a semiconductor composite in accordance with the present invention. The composite comprises, for example, an N-type silicon substrate 1 with resistivity of about 1 ohm cm and a layer of tin oxide or stannic oxide ($SnO_2$) 2 yielded by pyrolysis of dimethyl tin dichloride or dimethyl stannous chloride ($(CH_3)_2SnCl_2$) or the like and deposited on said substrate. The $SnO_2$ layer 2 comprised in the inventive composite is so selected as to be well conductive and constitute itself an N-type semiconductor. The conductivity of this $SnO_2$ layer is close to that of a metal, or about $10^{20}$ atoms/cm$^3$ in terms of free electron concentration. The $SnO_2$ layer 2 having the characteristics of N-type semiconductor can be formed by a rapid chemical reaction yielding $SnO_2$, this being presumably accounted for by the excess of metal (shortage of oxygen) resulting from the rapidity of the progress of reaction.

It was discovered that a composite of such structure and composition has a rectifying characteristic and that such composite takes on a photoelectric function when radiation energy is supplied to the heterojunction formed inside the composite. One of possible interpretations of the discovery is that said formation of heterojunction is actually formation of Schottky barrier between said $SnO_2$ layer and the semiconductor substrate, $SnO_2$ being regarded as a metal.

Figure 2:
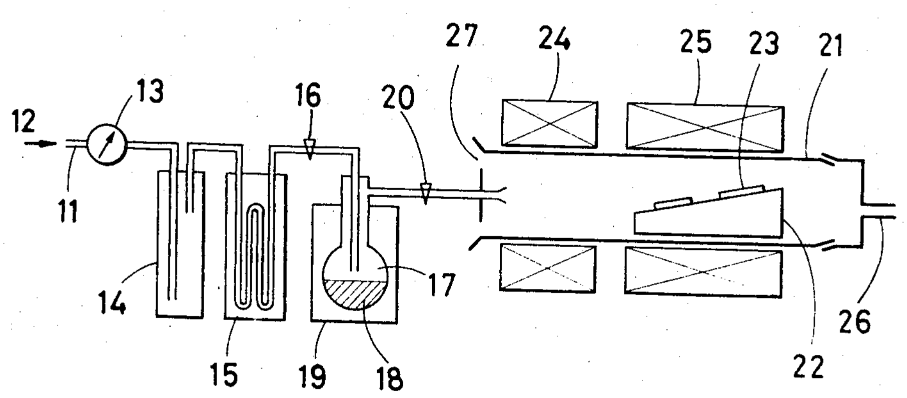
FIG. 2 shows an apparatus used for manufacture of a semiconductor composite in accordance with the present invention.

Referring now to FIG. 2, there is shown a preferred arrangement of apparatus for manufacture of the composite shown in FIG. 1. Air 12 as carrier gas is introduced into the system through pipe inlet 11. Said air 12 is then flowed successively through gas flow meter 13, carrier gas drying chamber 14 filled with silica gel, heating oil bath 15 of 120°–180°C for heating the carrier gas passing therethrough. The air passes through a pipe in oil bath 15 in heat exchange therewith, then passes through a carrier gas control cock 16 and into evaporator 17 containing a solution 18 of dimethyl tin dichloride ($(CH_3)_2SnCl_2$). This solution is heated by an oil bath 19 to 110°–140°C. The air then passes through a lateral pipe containing cock 20 into the furnace pipe 21 of an electric furnace. Inside the electric furnace is provided a quartz board 22 on which is placed silicon wafers 23. Around the inlet end of pipe 21 is provided a heater 24 for preheating the mixed gas. Around the middle portion of the pipe 21 is installed another heater 25 at a position opposite to the quartz board 22 for heating the reaction zone to 450°–750°C. The gas in the furnace pipe 21 is forced out of exhaust gas outlet 26 at a constant flow rate. In case the exhaust flow rate through exhaust outlet 26 is higher than that of the inlet flow of air 12, the resultant shortage of air corresponding to the difference between them is covered by additional supply of air into furnace pipe 21 through inlet 27.

In the process of manufacturing an inventive composite, air 12 taken in through pipe inlet 11 is passed through cariier gas drying chamber 14 charged with silica gel, dried therein and then passed through oil bath 15, wherein the dried air is heated to 120°–180°C. The thus heated air is then passed into evaporator 17 containing the dimethyl tin dichloride solution. The dimethyl tin dichloride in evaporator 17 is preheated by oil bath 19 to a temperature slightly higher than its melting point of 106°C, namely 110°–140° C, so that the evaporator 17 is filled with its vapor. The air flowing into the evaporator is mixed with the vapor of dimethyl tin dichloride and this mixed gas is then passed past cock 20 into furnace pipe 21 of the electric furnace. In furnace pipe 21 the mixed gas is first heated by preheater 24 and then allowed to flow into the reaction zone. In the reaction zone is positioned boat 22 with silicon wafer 23 on it, which wafer is preheated by heater 25 to 450°–750°C. In the reaction zone, $O_2$ and $(CH_3)_2SnCl_2$ in the mixed gas undergo decomposition and oxidation reactions, and thereby a film of tin oxide is firmly deposited on the surface of silicon wafer. FIG. 1 shows the sectional structure of the $SnO_2$-Si composite thus produced.

The process reaction can be described by the equation:

$$(CH_3)_2SnCl_2 + O_2 \rightarrow SnO_2 + 2CH_3Cl$$

The tin oxide film formed by this method is of high optical transparency, its transmission rate being higher than 80–90 percent for light of wavelength 400 mμ–800 mμ (milimicron). This film is also highly conductive. If desired, however, its conductivity can be further enhanced (resistivity diminished) by incorporation of a small amount of antimony trichloride ($SbCl_3$) into the dimethyl tin dichloride solution 18.

After a predetermined length of time, the gas supply to the furnace pipe 21 is stopped, the coated silicon wafer is removed from the oven, and cooled at ambient room temperature.

Shown below is an example of preferred reaction conditions:

| | |
|---|---|
| Air flow rate at inlet | 1.5 l./min. |
| Exhaust gas flow rate at outlet | 11.1./min. |
| Oil bath 19 temperature | 125°C |
| Preheater temperature | 250°C |
| Heater temperature | 500°C |
| Time period of supply of mixed gas | 90 sec. |

(On lapse of this time period the substrate was taken out of the pipe, i.e., out of the heated atmosphere to atmosphere of normal temperatures.)

| | |
|---|---|
| Thickness of resultant $SnO_2$ film | 7,000 A |

This $SnO_2$ film may preferably be allowed to grow thicker in case an electrode is to be formed thereon. It was observed that the thinner the film formed, the higher the sheet resistivity of the film was and also the poorer the rectifying characteristic of the film when it was provided with an electrode. This is presumably accounted for by the increased possibility of the uneven film thickness resulting in an increased risk of current leakage from the electrode to the substrate.

It was also observed that the thickness of the $SnO_2$ film formed was proportionally dependent upon the time period and temperature of $SnO_2$ deposition reaction. Thus, in order to make the $SnO_2$ film thicker, it is advisable to raise the said reaction temperature and/or make the reaction time longer. It was also found that the higher the reaction temperature, the higher the adhesion of the $SnO_2$ film formed to the semiconductor substrate and the firmer and more stable the film thus formed. It was, however, also observed that raising the reaction temperature and making the reaction time period longer were bound to result in deterioration of the rectifying characteristic of the resultant composite. Taking these into consideration, it was concluded that a preferable range or reaction temperature would be 450°–700°C, the most preferred temperature being about 500°C. As to the reaction time period, it may preferably range from 60 to 130 seconds, the most preferred being about 90 seconds.

As well known to those skilled in the art of $SnO_2$ film deposition, the sheet resistivity of $SnO_2$ film can be lowered by incorporation of $SbCl_3$ in the source material. This incorporation of $SbCl_3$ was tried also in the inventive process. As a result, it was observed that the amount of $SbCl_3$ in the source material. This incorporation of $SbCl_3$ was tried also in the inventive process. As a result, it was observed that the amount of $SbCl_3$ incorporated was another factor affecting the sheet resistivity of $SnO_2$ film, the electric characteristic of the composite, etc. It was further observed that a preferred range of the ratio of $SbCl_3$ incorporated to the weight of source material $(CH_3)_2SnCl_2$ was 0.25 to 3 weight percent, the most preferred being about 1.5 weight percent.

It was discovered that N-type silicon semiconductor is a suitable material for the substrate of said composite. However, a semiconductor composite of the like rectifying characteristic was also able to be implemented with the use of P-type silicon semiconductor. In using P-type material, however, it was found to be preferable to cause the $SnO_2$ deposition reaction at a somewhat higher temperature or to give a proper heat treatment to the composite made by $SnO_2$ deposition at the reaction temperature recommended above. It was further discovered that composits of a similar rectifying characteristic were also able to be manufactured with Ge or GaAs as substrate materials.

It is apparent that in view of the rectifying characteristic and photoelectric characteristic of the composite so manufactured, various semiconductor applications of the composite can be made. Above all, in view of the fact that the composite shows the excellent photoelectric characteristic and yet the $SnO_2$ layer is transparent, it may be particularly advantageously utilized as a photoelectric device. Application of this novel composite into said devices, however, will call for such additional steps of processing as scribing, electrode depositing, packaging, etc.

Figure 3:
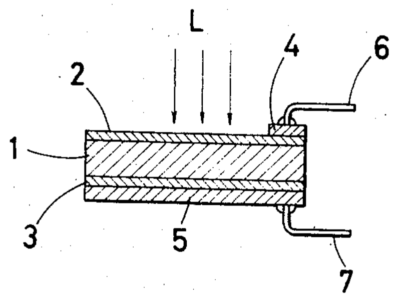
FIG. 3 is a sectional view of a photoelectric device fabricated from a semiconductor composite in accordance with the present invention.

An example of the composite applied as photoelectric devices is shown in FIG. 3. The photoelectric device shown in FIG. 3 comprises the composite as illustrated in FIG. 1, wherein like numerals are used to designate like parts. The photoelectric device of FIG. 3 comprises the above-mentioned composite, a tin oxide film 3 on the under surface of the substrate, a nickel film 4 for electrode deposition at one end of the tin oxide film 2 on the light receiving surface, i.e., the upper surface and another nickel film 5 for electrode deposition completely over the tin oxide film 3 deposited on the under surface of the composite. When the light receiving or upper surface of the device is subjected to the light energy L, an electromotive force is generated between tin oxide film 2 on the upper surface and silicon substrate 1 and this electromotive force is effected across the positive and negative lead wires 6 and 7 connected to nickel film 4 and 5, respectively.

The semiconductor composite device shown in FIG. 3 can be produced by first depositing $SnO_2$ film 3 on one surface of silicon wafer 1 (shown as the under surface) and then depositing another $SnO_2$ film 2 on the other surface (shown as the upper surface), both being deposited in accordance with the above-mentioned $SnO_2$ deposition process. Thus, in order to make the device shown in FIG. 3, $SnO_2$ film 3 is first deposited on silicon wafer 1 and then, with silicon wafer 23 on boat 22 turned over, the above-mentioned reaction is repeated so as to have tin oxide film formed also on the opposite surface of silicon wafer 23, this second reaction also serving as a heat treatment of the tin oxide film 3 formed in the first reaction. Of the tin oxide films thus formed on opposite sides of silicon wafer, film 2 formed in the second reaction is more suitable as light-receiving surface. It was observed that the heat due to the second reaction gives rise to a better ohmic contact between the silicon wafer and the tin oxide film 3 formed in the first reaction. This is presumably accounted for by the fact that the heat to which the tin oxide film 3 formed in the first reaction is subjected in the course of the second reaction causes this film to penetrate to some extent into the silicon wafer, this producing a better ohmic contact between said film and wafer.

The thickness of the tin oxide film 2 on the side to be used as the light receiving surface is preferably in the range of 5,000–8,000 A., while the preferred thickness for the tin oxide film 3 on the opposite side for the ohmic contact is 3,000–4,000 A.

The silicon wafer thus provided with tin oxide film on the opposite surfaces is taken out of the electric furnace, cut to chips of the predetermined size and shape, if necessary, and then, as illustrated in FIG. 3, provided with nickel film 4 to which an electrode is to be attached. This nickel film is formed by a photo-etching process or the like on one end portion of the tin oxide film 2 deposited in the second reaction on the light receiving surface. The nickel film 5 is formed on the other side of the substrate 1 all over the tin oxide film 3 deposited thereon, this film 5 being utilized as electrode film 5 for taking electric energy out of the semiconductor composite. Then electrode lead wires 6 and 7 are attached to nickel films 4 and 5 respectively by, for example, soldering and the photoelectric device is thus completed.

The photoelectric device thus fabricated generates an electromotive force when it is subjected to light of a wavelength in the range of 400–1,000 m. It should be particularly noted that this photoelectric device has a high sensitivity peak in the short wavelength region of 500–600 m$\mu$ where an output tended to be lower with the conventional silicon photoelectric devices. Thus, the inventive device, when combined with a proper filter will provide, a photoelectric conversion characteristic very closely similar to the human visual sensitivity curve. This capability of having a peak in the short wavelength region may presumably be accounted for by the fact that, due to small absorption of the incident light, the short wavelength region of the light can reach the $SnO_2$-Si heterojunction and interference of light caused by the $SnO_2$ film will be minimized.

The photoelectric device thus produced, unlike the conventional silicon photoelectric devices, has no PN junction provided by the diffusion process, but merely comprises a tin oxide film simply deposited on an N-type conductivity substrate, for example, by the described pyrolytic reaction. Nevertheless, as shown by the curve A of FIG. 4, which curve A represents the characteristics of the composite of the invention, this photoelectric device has been found to have an extremely favorable electromotive characteristic. This electromotive force is believed to be generated either by a semiconductor-semiconductor heterojunction or by a semiconductor-metal barrier. In any case, it has been shown empirically that this type of photoelectric device can be made by the above-mentioned method with very good reproductivity.

The electrode 3 on the under surface of silicon substrate 1 is of the same material as the tin oxide film deposited on the light receiving surface but this tin oxide film electrode on the lower surface is in good ohmic contact with silicon substrate 1 presumably owing to the heat applied in the process of depositing tin oxide film on the light receiving surface and can well serve as an electrode for the silicon substrate.

In employing the conventional silicon photoelectric device, it was essential to provide an anti-reflection film over the light receiving surface thereof because the refractive index of silicon is 4. Such anti-reflection film is, however, superfluous with the inventive photoelectric device, for the refractive index of tin oxide deposited on the light receiving surface is about 2 and this film itself serves as an effective anti-reflection layer. Since the photoelectric device shown in FIG. 3 has tin oxide layers on opposite sides, the electrodes can be provided with ease by depositing nickel to form films over the tin oxide layers on the opposite sides, respectively.

Figure 4:
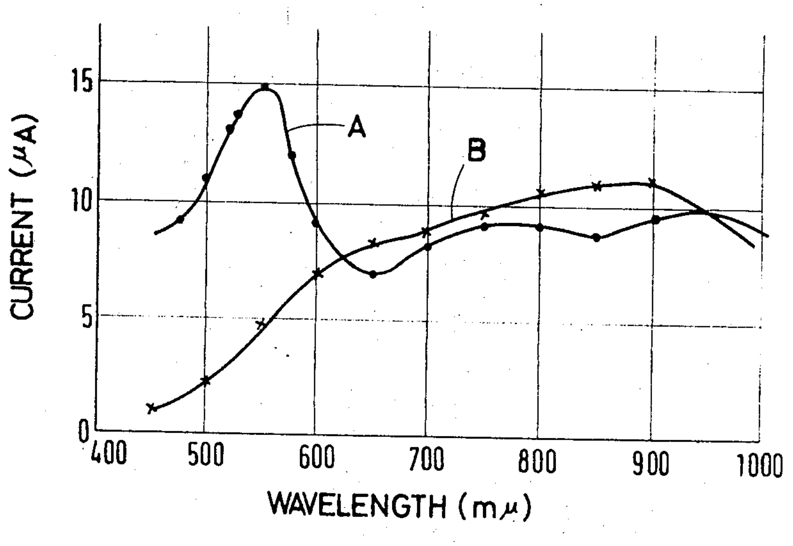
FIG. 4 is a graph showing comparing the spectral sensitivity characteristic of a photoelectric device in accordance with the present invention and that of a conventional silicon photoelectric device.

FIG. 4 is a graph showing a comparison of the characteristics of a photoelectric device fabricated in accordance with the present invention and that of a conventional silicon photoelectric device of PN junction type. Curve A represents the characteristic of the inventive photoelectric device and curve B the characteristic of a conventional photoelectric device. As seen from the curves of the graph, the photoelectric device made in accordance with the present invention has a high sensitivity peak in the region of 300–600 m$\mu$ in which region a drop of output current was found with conventional photoelectric devices. The inventive photoelectric device thus exhibits a favorable spectral characteristic closely resembling the human visual sensitivity curve. The open circuit voltage of the inventive photoelectric device is 0.45 V. In fabrication of the photoelectric device shown in FIG. 3, the electrode for the $SnO_2$ film 2 is prepared by depositing Ni by vacuum evaporation or sputtering, while the electrode for the Si substrate is prepared by first depositing $SnO_2$ film 3 and then dep ositing Ni further thereon by vacuum evaporation or sputtering.

Figure 5:
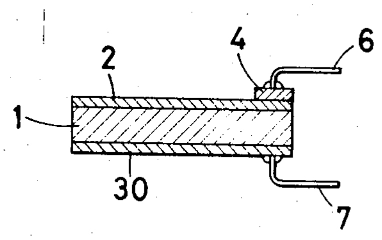
FIG. 5 is a sectional view of a photoelectric device in accordance with the present invention provided with a different electrode structure.

FIG. 5 shows a photoelectric device of another preferred embodiment of the present invention having a different electrode structure. This device has the electrode for $SnO_2$ film 2 prepared by depositing a Ni layer 4. Nickel has proved to be one of the best suited for the purpose in view of its high conductivity, adhesion to the substrate and moderate cost. Alternatively, however, silver, gold, chromium, aluminum, etc., can be used for this purpose. The device shown in FIG. 5 is also provided with an electrode 30 made of eutectic crystals of Au or Au-Sb with Si.

Figure 6:
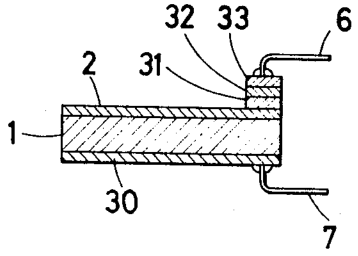
FIG. 6 is a sectional view of a photoelectric device in accordance with the present invention provided with still another electrode structure.

FIG. 6 shows a photoelectric device of another electrode structure. The electrode for $SnO_2$ film of this device is of a triple layer construction composed of the bottom layer 31 of Ti deposited on $SnO_2$ film 2, a first metallic layer 32 deposited thereon and the second metallic layer 33 deposited atop thereof. It was found that a preferred material for the first metallic layer is Cu or Ag, while Au, Ni or Al is preferred for the second metallic layer.

Figure 7:
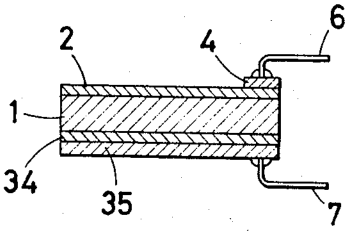
FIG. 7 is a sectional view of a photoelectric device in accordance with the present invention provided with a further electrode structure.

FIG. 7 illustrates a photoelectric device of still another electrode construction. The electrode for the Si substrate of this device comprises a Ti layer 34 deposited on the substrate and Ni layer 35 deposited on the Ti layer 34. In order to implement the device of FIG. 5, a treating temperature of about 390°C is required for eutectic crystallization of Au or Au-Sb with Si. However, treatment at such a high temperature is bound to affect adversely the rectifying characteristic of the $SnO_2$-Si composite. The temperature required for preparation of the electrode of the device of FIG. 7 is only about 200°C which solved the problem of deterioration of the rectifying characteristic and yet much improved the ohmic contact.

Figure 8:
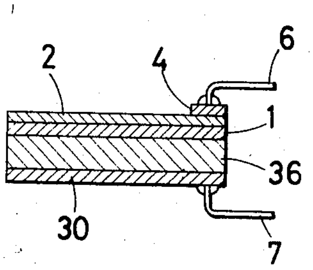
FIG. 8 is a sectional view of a novel photoelectric device comprising a combination of a semiconductor composite in accordance with the present invention with a conventional silicon photoelectric device.

FIG. 8 shows a photoelectric device of another embodiment of interest in accordance with the present invention, which is basically a combination of $SnO_2$-Si composite with Si PN junction photoelectric device. The device of FIG. 8 comprises, for example, P-type silicon semiconductor layer 36, N-type semiconductor layer 7 several microns thick formed by diffusion on one side of the P-type semiconductor layer 36 with a PN junction formed therebetween, electrode film 30 of Au deposited on the other side of said P-type semiconductor layer 36, tin oxide ($SnO_2$) layer 2 deposited on the other side of said N-type semiconductor layer 1, lead 7 connected to said Au electrode 30 and another lead 6 connected to electrode 4 deposited on the thin oxide film 2.

Figure 9:
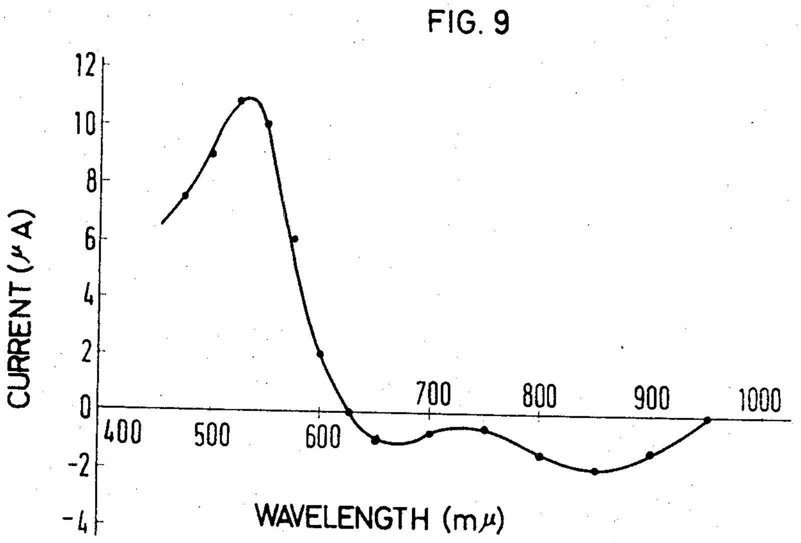
FIG. 9 is a graph showing a spectral sensitivity characteristic of the photoelectric device shown in FIG. 8.

In operation of the device illustrated in FIG. 8, upon impingement of light on the side of tin oxide film 2, the spectral sensitivity characteristic shown in FIG. 9 is obtained, electrode 4 being positive and electrode 30 negative. As seen from FIG. 9, the sensitivity peak is provided somewhere between 500–600 m$\mu$ in the region of short wavelength and inversion of polarity takes place in the vicinity of 600–700 m$\mu$.

The described characteristic may be accounted for as follows. As well known, upon impingement of light on a PN junction device, a photoelectromotive force is generated so that the P-type region is positive and the N-type region is negative. The spectral characteristic of this kind of device is as shown by curve B of FIG. 4. On the other hand, between the tin oxide film and N-type semiconductor layer, another photoelectromotive force is generated so that tin oxide film 2 be positive and substrate 1 be negative, as shown by curve A of FIG. 4. The tin oxide film 2 exhibits a high transmission rate for light wavelength 400–1,000 m$\mu$, while the semiconductor silicon layer has so high an absorption coefficient that light of wavelength of visible range is almost completely absorbed as it passes through such layer several microns thick. Near the light receiving surface of the device, rays of relatively short wavelengths are better absorbed, while rays of longer wavelengths are progressively better absorbed as it comes farther away therefrom.

Thus, a combined photoelectric device which, as shown in FIG. 8, comprises a combination of these two types of photoelectric devices with electrode 4 as positive and electrode 30 as negative gives rise to the above-mentioned photoelectromotive force between the tin oxide film 2 and N-type semiconductor layer 1, upon impingement of light on the side of tin oxide film 2. This photoelectromotive force is generated in a relatively short wavelength range of 500–600 m$\mu$ with electrode 4 as positive. As the wavelength of the incident ray increases, the ray eventually reaches the PN junction to cause generation of a photoelectromotive force with N-type semiconductor layer 1 as negative and P-type semiconductor layer 36 as positive, as already described above. The electromotive force generated between tin oxide film 2 and N-type semiconductor layer 1 is opposite in polarity or sense of flow of the current to the electromotive force generated in the PN junction. As a result, the photoelectromotive force with electrode 4 as positive supersedes the other in the range of relatively short wavelength, while the photoelectromotive force with electrode 30 as positive is dominant in the range of long wavelength. The overall spectral characteristic is as shown in FIG. 9.

Thus, according to the embodiment shown in FIG. 8, the output characteristic in longer wavelength range is opposite in polarity to that in shorter wavelength range and hence the interference from the longer wavelength range can be eliminated whtn the output signal in the shorter wavelength range is to be obtained. With this embodiment, it is also possible to infer the wavelength range of the incident light from the polarity determined. Though the device in accordance with the above-mentioned embodiment has a tin oxide film deposited on an N-type semiconductor layer, a device perfectly identical in function subject to inversion of polarity can be obtained by depositing the tin oxide film on P-type semiconductor layer.

The composite shown in FIG. 1 can be fitted with electrodes without further processing to fabricate the devices of FIG. 3 and FIGS. 5 to 7. Depending on the designs of desired photoelectric devices, however, it may be necessary also to scribe the composite of FIG. 1 into chips in addition to fitting thereof with electrodes.

Figure 10:
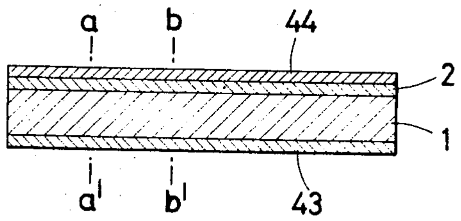
FIG. 10 is a sectional view illustrating the process of scribing a semiconductor composite in accordance with the present invention.
Figure 11:
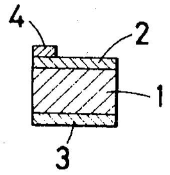
FIG. 11 is a sectional view illustrating a semiconductor composite chip in accordance with the present invention prepared by the scribing process shown in FIG. 10.
Figure 12:
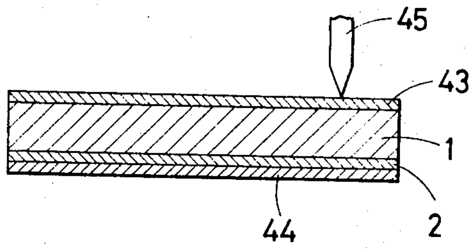
FIG. 12 is a sectional view illustrating in greater detail the process of scribing a semiconductor composite in accordance with the present invention.

FIGS. 10 to 12 illustrate the process of making chip-shaped photoelectric devices by scribing and fitting with electrodes of the composite shown in FIG. 1. Electrode metal layer 44 is formed on tin oxide film 2 of the composite shown in FIG. 1 heated to about 200°C by vacuum evaporation or sputtering. Though nickel is preferred as electrode material in view of the conductivity, adhesion to the substrate, cost, etc., silver, gold, chromium, aluminum, etc., may also be utilized. Since the electrode metal layer 44 is formed by vacuum evaporation, a uniform layer thickness can be achieved, the proper thickness of the electrode metal layer 44 being 0.8 – several microns. Another electrode metal layer 43 similar to the layer 44 can be deposited as necessary on the underside of semiconductor substrate 1. The electrode metal layer 43 can be dispensed with when, for instance, semiconductor substrate 1 is attached to gold-plated metal tab with a gold-silicon eutective crystal layer therebetween.

After electrode metal layer 44 has been deposited on tin oxide film 2, semiconductor substrate 1 is divided by the known scribing method along the lines *a—a'* and *b—b'* into chips of a predetermined size. This scribing can be accomplished by application of a constant force without the risk of substrate 1 being broken partially, since said electrode metal layer 44 uniformly formed on the composite by vacuum evaporation serves to reinforce the composite. Then electrode metal layer 44, with a part thereof reserved, is removed by chemical etching and is thus completed a semiconductor photoelectric device as shown in FIG. 11. Said partial etching is preferably carried out as uniformly and as quickly as possible.

Thus, the method of manufacturing a semiconductor device, as shown in FIG. 10, consists in first forming a tin oxide film on a semiconductor substrate, depositing an electrode metal layer of nickel or the like thereon by vacuum evaporation and then dividing the semiconductor substrate with said electrode metal layer by scribing. This method is particularly suited for mass production in view of the fact that a large number of uniform elements can be manufactured with ease. Alternatively, the unnecessary portion of the electrode metal film may be removed before scribing.

A preferred mode of scribing the composite of FIG. 10 is illustrated in FIG. 12. As shown in FIG. 12, the composite of FIG. 10 is turned over and scribing is performed lengthwise and breadthwise with the use of a diamond cutter 45 on the side of composite on which electrode 43 is deposited. It is advisable to have a piece of adhesive tape attached to the electrode layer 44 of substrate 1. On completion of scribing, pressure can be applied from the side covered with adhesive tape in a direction vertical to the main surface of substrate 1 and thus the substrate 1 can be divided into a plurality of chips along the scribed lines. When the adhesive tape is removed, semiconductor composite chips as shown in FIG. 11 can thus be obtained.

As described above, the scribing method shown in FIG. 12 is unique in that scribing is done on a main surface opposite to the plane on which the tin oxide film is formed. Therefore, by this method the semiconductor substrate with tin oxide film thereon can be efficiently divided into a large number of semiconductor devices without deterioration of the barrier characteristics.

Yet, cracks might be formed in the sides of divided chips, this causing deterioration of the barrier characteristics. In order to prevent this, it is advisable to slightly etch away the sides of resultant chips. It was discovered that by such surface treatment the rectifying characteristics of the composite chips are improved. This etching of the sides of chip substrate can advantageously be performed simultaneously with etching of $SnO_2$ film.

Proper packaging will be required for utilizing the $SnO_2$-Si composite chip thus obtained as a photoelectric device. Preferred examples of such packaged devices and a method of manufacturing are illustrated in FIGS. 13A to 15.

Figure 13A:
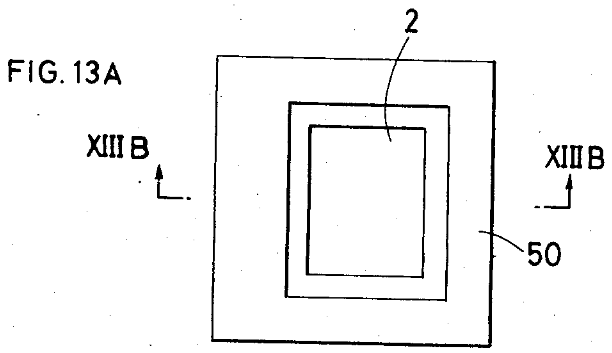
FIG. 13A is a top view of a photoelectric device prepared by packaging a semiconductor composite chip in accordance with the present invention.
Figure 13B:
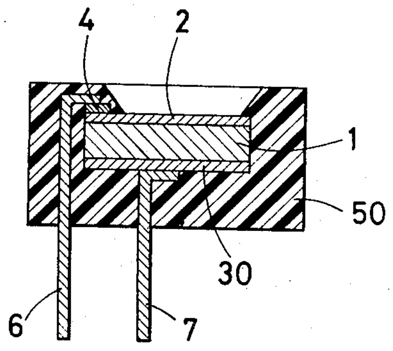
FIG. 13B is a sectional view of the photoelectric device of FIG. 13A along the line XIIIB—XIIIB.

Referring to FIGS. 13A and 13B, the device illustrated therein comprises N-type silicon single crystal substrate 1, tin oxide film 2, electrodes 4, 30, lead wires 6 and 7 connected to electrodes 4 and 30, respectively, and epoxy resin housing 50 for housing the composite. The lead wire 6 extending from the main surface on the light receiving side of the composite is led toward the opposite surface via a bent portion to be arranged parallel to the lead 7 extending from this opposite surface. The semiconductor substrate, with the exception of light receiving area, is entirely covered with epoxy resin housing so that the semiconductor composite is thus protected from the outside. The photoelectric device or photodiode thus fabricated is simple in construction, compact and mechanically strong, yet is excellent in photosensitivity and other characteristics.

Figure 14:
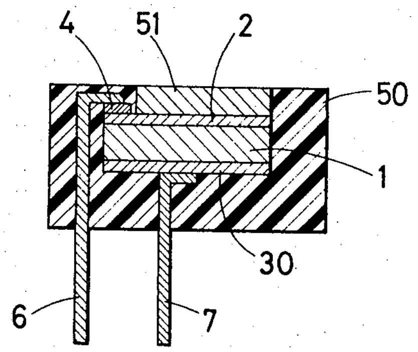
FIG. 14 is a sectional view of a photoelectric device prepared by packaging in another manner a semiconductor composite chip in accordance with the present invention.

FIG. 14 illustrates another example of packaging of photoelectric device in accordance with the present invention. The photoelectric device shown therein has, compared with the device shown in FIG. 13, an additional transparent glass plate 51 for protection of $SnO_2$ film 2 on the light receiving area of the composite. The remaining parts of this device are identical with that shown in FIG. 13. Glass plate 51 is placed on the light receiving area. This glass plate 51 preferably is thicker than the corresponding height of the lead 6 connection. For instance, by using a glass plate 1 mm thick it is possible to level the top surface of resin housing 50 with that of glass plate 51. Such an arrangement wherein the external surface on the light receiving side is a level plane is preferred for ease in manufacturing the package. Further advantages are that glass plate 51 serves mechanically to reinforce the light receiving surface and also effects protection from outside atmosphere. Also, with the use of colored glass as glass plate 51 it is possible to provide a photoelectric device with a desired spectral sensitivity. It is preferred to have this glass plate 51 pasted to the tin oxide film 2.

Figure 15:
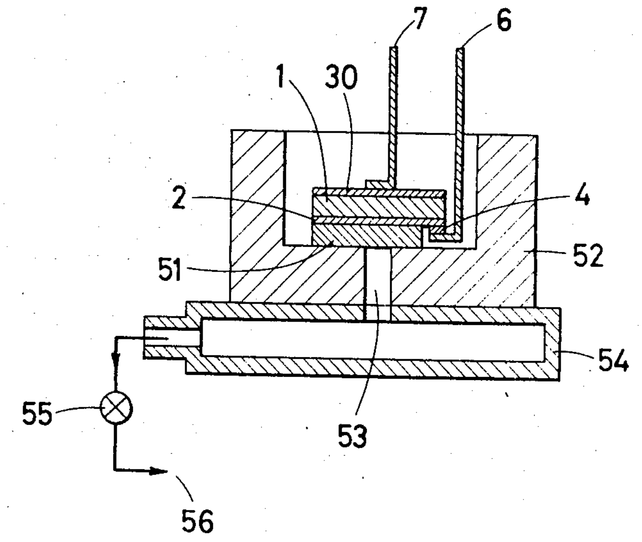
FIG. 15 is a sectional view illustrating the process of packaging the device shown in FIG. 14.

FIG. 15 shows an example of a process for packaging of the semiconductor photoelectric device shown in FIG. 14. As shown, the mold 52 for silicone rubber molding has a cavity in the center, this cavity communicating through hole 53 at the bottom of the mold with nozzle 54 attached to mold 52. The nozzle 54 is connected through valve 55 to vacuum pump 56. Glass plate 51 is pasted in advance to tin oxide film 2 and is so positioned that it comes into contact with the bottom of mold 52. When valve 55 is opened, glass plate 51, and accordingly semiconductor substrate 1, is pressed against the bottom of mold 52 by vacuum suction applied through the hole 53 at the bottom of mold 52. Epoxy resin is then injected into mold 52. On hardening of the resin, a semiconductor photoelectric device as illustrated in FIG. 14 is obtained.

For manufacture of a photoelectric device whose tin oxide film 2 and resin housing 50 on the light receiving side do not constitute a level plane, as illustrated in FIG. 13, there is used a mold with a matching protrusion in the center of the bottom thereof. These embodiments of the present invention have been described with reference to a synthetic resin as the insulating material for covering the semiconductor substrate. It is also possible to use glass instead of the synthetic resin.

In general, in employing a photoelectric device utilizing the barrier formed between a semiconductor substrate and a tin oxide film, it is very difficult to have the tin oxide film itself as a lead extended over the main surface and side of the composite toward the opposite side thereof. Hence, the present embodiment is particularly useful where such a barrier is formed with a tin oxide film.

The semiconductor composite shown in FIG. 1 also enables fabrication of an integrated semiconductor photoelectric apparatus of high integration degree comprising a great number of photoelectric elements arranged on a single substrate. Such an integrated apparatus is provided with an $SnO_2$ film formed on a silicon substrate in a desired pattern by a photochemical process.

FIGS. 16 to 25 are sectional views of the composite in several stages of the process of manufacturing integrated photoelectric apparatus in accordance with a preferred embodiment of the present invention.

Figure 16:
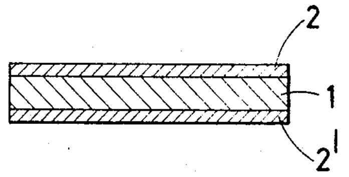
FIGS. 16 to 25 are sectional views of composites in several stages of fabrication intended for illustrating the process of fabricating an integrated photoelectric apparatus from or with the use of the semiconductor composite in accordance with the present invention.

Referring to FIG. 16, the composite now comprises silicon single crystal substrate 1 and $SnO_2$ films 2 and 2' deposited on the topside and underside of said substrate. In the first step of processing, as shown in FIG. 16, thin $SnO_2$ films 2 and 2' are deposited on both sides of silicon single crystal substrate 1 by vacuum evaporation.

Figure 17:
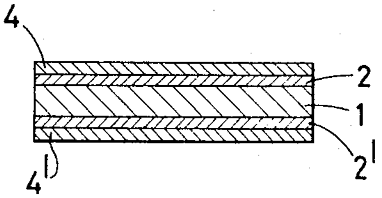

Then, as shown in FIG. 17, nickel layers 4 and 4' are formed by galvanizing, utilizing the conductivity of $SnO_2$ films 2 and 2'. Alternatively, layers 4 and 4' may be formed by vacuum evaporation or sputtering.

On both sides of the composite so prepared as shown in FIG. 17 are formed photosensitive resin films 60 and 60' in a desired pattern. In the example shown in FIG. 18 photosensitive resin films 60 and 60' were formed all over the previously formed nickel layers 4 and 4' and then the unnecessary portions of the sensitive resin film on the topside 60 were removed by a known photo-etching method to provide a film of desired pattern.

Figure 18:
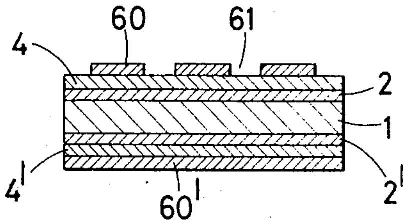
Figure 19:
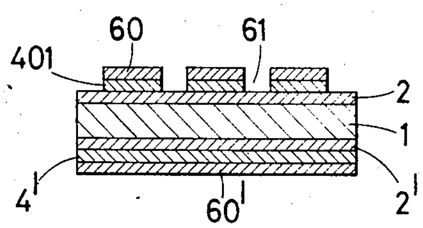

The resulting composite as shown in FIG. 18 is then dipped in a solution of ferric chloride for etching away the portions of nickel layer 4 exposed through openings 61 of sensitive resin film 60 and thereby is obtained a composite with a plurality of electrodes 401 on the topside separated from one another, as shown in FIG. 19.

Figure 20:
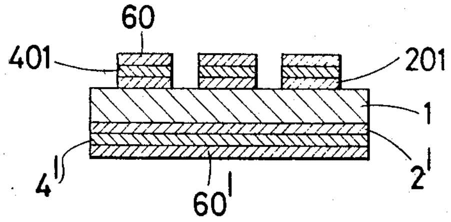

Then, the composite shown in FIG. 19 is first coated with zinc powder and then dipped in a solution of hydrochloric acid for removal by etching of $SnO_2$ film 2 exposed through the openings 61 of photosensitive resin film 60 and thereby is obtained a composite with a plurality of light receiving areas 201 on the topside separated from one another, as shown in FIG. 20.

Figure 21:
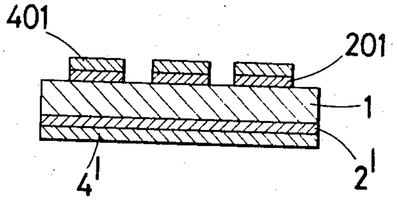

Photosensitive resin films 60 and 60' of the composite shown in FIG. 20 are now dissolved away and thereby is obtained a composite with $SnO_2$ film 2' and nickel layer 4' as common electrode on the underside of silicon single crystal substrate 1 and with a plurality of $SnO_2$ films 201 and nickel layers 401 on the topside separated from one another, as shown in FIG. 21.

Figure 22:
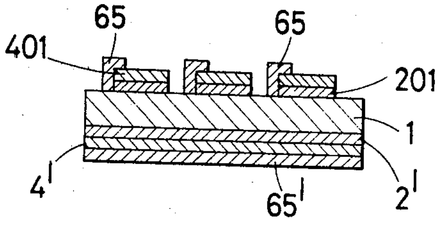

Then, on nickel layer 401 of the composite shown in FIG. 21, photosensitive resin film 65 is applied again to an area other than a portion which is later to form the light receiving plane as shown in FIG. 22.

Figure 23:
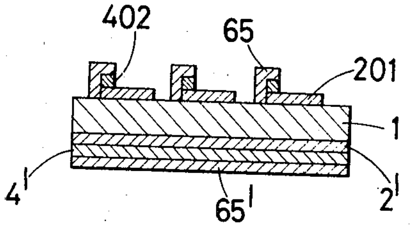

The composite shown in FIG. 22 thus obtained is then again dipped in a solution of ferric chloride for removal by etching of nickel layer 401 where it is exposed, i.e., not covered with photosensitive resin film 65, and thereby is obtained a composite with small portions 402 of nickel layers reserved which are to be finished later as electrodes as shown in FIG. 23.

Figure 24:
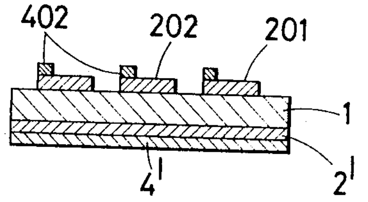

Finally photosensitive resin films 65, 65' of the composite shown in FIG. 23 are dissolved away and thereby is obtained a composite as shown in FIG. 24. The composite of FIG. 24 has the underside of silicon single crystal substrate 1 connected over $SnO_2$ film 2' to nickel layer 4' which constitutes a common electrode. The portions of $SnO_2$ film 201 not covered with nickel electrodes 402 on the topside of the substrate constitute the light receiving area 202 and the electromotive force resulting from incidence of light into these areas appears itself as output voltage between nickel electrodes 402 at one end of each light receiving area and nickel layer 4' as common electrode on the underside.

Figure 25:
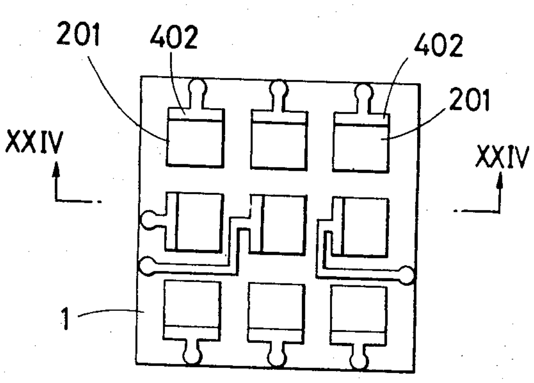

FIG. 25 is a plan view of the integrated photoelectric apparatus fabricated by the described method of integration, whose cross section along the lines XXIV—XXIV is shown in FIG. 24.

As may be seen from FIG. 24, it is possible by the described inventive method to enable manufacture on a mass production basis of an integrated photoelectric apparatus of a high degree of integration comprising a large number of $SnO_2$ light receiving areas formed on a silicon single crystal substrate 1 and also provided with nickel electrodes 402 for individually taking out the electromotive force generated at each light receiving area 201. The integrated photoelectric apparatus thus fabricated is useful for pattern recognition, such as character reading.

As will be apparent from the description above, this embodiment of the present invention enables integration of a large number of photoelectric elements on a silicon single crystal substrate. This method is well suited for mass production of high-precision elements with a high degree of reproductivity, in view of the process of forming patterns by chemical etching.

As described in conjunction with FIGS. 16 to 25, the process of manufacturing integrated $SnO_2$-Si composites calls for the technique of photo-etching $SnO_2$ film. Described below in conjunction with FIGS. 26 to 32 is another example of $SnO_2$ film photo-etching process. FIGS. 26 to 32 are sectional views of the composite taken vertically to the main surface at several stages of an example of photo-etching a transparent, conductive $SnO_2$ film deposited only on one side of the substrate.

Figure 26:
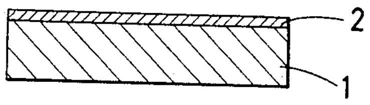
FIGS. 26 to 32 are sectional views of composite in several stages of fabrication intended for illustrating another practical example of $SnO_2$ film photo-etching technique suited for manufacture of an integrated photoelectric apparatus from or with the use of the semiconductor composite in accordance with the present invention.

Referring to FIG. 26, there is shown a composite comprising $SnO_2$ film deposited on semiconductor substrate 1. In the first step of the process, $SnO_2$ thin film 2 is deposited on one side (over the entire area) of the semiconductor substrate by vacuum evaporation, as shown in FIG. 26.

Figure 27:
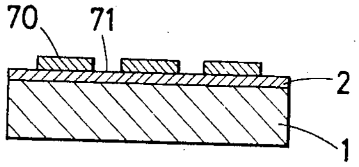
Figure 28:
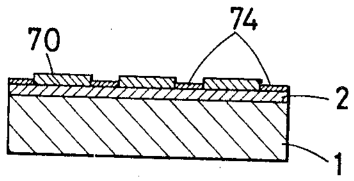
Figure 29:
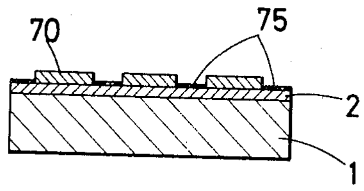

Then there is deposited on the composite so obtained a film of photosensitive resin or photoresist 70 in a desired pattern, as shown in FIG. 27. The composite of FIG. 27 thus obtained has then zinc layer 74 deposited on an exposed portion 71 where the photosensitive resin film has been etched away and the $SnO_2$ film is exposed by galvanization, utilizing the conductivity of the $SnO_2$ film, as shown in FIG. 28.

One of the problems in this stage is that, $SnO_2$ film 2 being a layer of metal oxide, it is difficult to have zinc uniformly deposited thereon by galvanizing. This problem, however, can be solved by dipping the composite of FIG. 28 provided with a thin zinc-galvanized layer 74 in a 5 percent solution of hydrochloric acid (solution). The liberated hydrogen reduces the surface of the $SnO_2$ layer 2 to form a thin layer of metallic tin (Sn) 75. This reaction may be terminated when the metallic lustre of the formed metallic tin has become noticeable.

Figure 30:
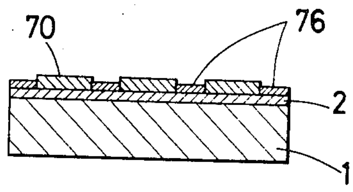

Then, zinc is again deposited by galvanization over the reduced metallic tin layer 75 and thus a firmly deposited uniform galvanized layer of zinc 76 is formed, as shown in FIG. 30.

Figure 31:
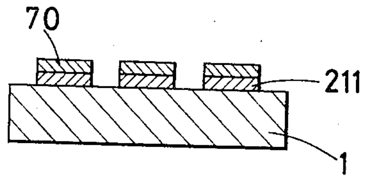

At the next stage, the composite of FIG. 30 is dipped in a 50 percent solution of hydrochloric acid for etching, whereby galvanized zinc layer 76 as well as $SnO_2$ layer 2 are etched away. The uniform thickness of galvanized zinc layer 76 then ensures a uniform progressive etching. The high concentration of the etching solution ensures rapid dissolving of $SnO_2$ film 2. This series of steps of dipping in 5 percent hydrochloric acid solution for reduction of $SnO_2$ film, zinc-galvanization on the reduced layer of metallic tin and subsequent dipping in 50 percent hydrochloric acid solution for etching of zinc and metallic tin layers are repeated several times until the $SnO_2$ film is perfectly removed, as shown in FIG. 31. In FIG. 31, 211 denotes the transparent conductive thin film of $SnO_2$ left unetched after the etching process.

Figure 32:
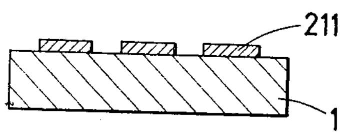

By removing photosensitive film 70 from the composite shown in FIG. 31 is obtained a composite as shown in FIG. 32, which comprises semiconductor substrate 1 and a plurality of pieces of $SnO_2$ transparent conductive films 211 thereon separated from one another.

Thus, according to the present example, separated pieces of transparent conductive $SnO_2$ film can be formed on a single semiconductor substrate with high accuracy. This process is particularly suited for mass production due to the fact that it does not call for such steps as vacuum evaporation. As a result of experiments with the etching solution of high concentration, the etching time period was shortened and a transparent conductive $SnO_2$ film free from pinholes was obtained.

While specific preferred embodiments of the invention have been described, it will be apparent that obvious variations and modifications of the invention will occur to those of ordinary skill in the art from a consideration of the forgoing description. It is therefore desired that the present invention be limited only by the appended claims.

What is claimed is:

1. A semiconductor composite comprising
a semiconductor substrate,
a tin oxide layer deposited on said semiconductor substrate and forming a barrier between said tin oxide layer and said semiconductor substrate having a rectifying characteristic, and
a metal electrode deposited on said tin oxide layer, said metal being a material selected from the group consisting of Ni and Ti.

2. The semiconductor composite according to claim 1 in which said semiconductor is a member selected from the group consisting of Si, Ge, and GaAs.

3. The semiconductor composite according to claim 1 in which said semiconductor is Si.

4. The semiconductor composite according to claim 3 in which said semiconductor is N-type conductivity Si.

5. A semiconductor composite according to claim 3 in which first Ti and then Ni are deposited on the silicon substrate to form an electrode thereon.

6. A semiconductor composite according to claim 1 wherein said tin oxide layer is of a thickness to receive radiation energy therethrough and further comprising means for withdrawing the photoelectric output between said tin oxide layer and said semiconductor substrate.

7. A semiconductor composite according to claim 6 and further comprising a transparent protective member applied to the tin oxide layer.

8. A semiconductor composite according to claim 1 wherein said semiconductor substrate itself comprises a semiconductor junction.

9. A semiconductor composite according to claim 8 wherein said semiconductor substrate comprises a silicon layer and has a PN junction, said silicon layer lying between said tin oxide layer and said PN junction.

10. A semiconductor composite according to claim 9 wherein said tin oxide layer is of a thickness to receive the radiation energy therethrough and wherein said tin oxide layer and said silicon layer are of a thickness so that the incoming radiation energy reaches the PN junction through the tin oxide layer, and further comprising means for withdrawing the photoelectric output of said composite.

11. A semiconductor composite according to claim 10 wherein said silicon layer is on N-layer whereby the photoelectric output from PN junction is opposite in polarity to the photoelectric output from tin oxide N-type Si composite.

12. A semiconductor composite according to claim 1 in which the metal electrode is a thin Ni film.

13. A semiconductor composite according to claim 1 in which the metal electrode comprises a Ti layer deposited on the tin oxide layer, a first metal layer deposited on the Ti layer and a second metal layer deposited on the first metal layer.

14. A semiconductor composite according to claim 13 in which the first metal layer is selected from the group consisting of Cu and Ag and the second metal layer is selected from the group consisting of Au, Ni, and Al.

15. A semiconductor composite according to claim 1 wherein said tin oxide layer comprises a plurality of separate, spaced films deposited on said semiconductor substrate whereby a plurality of rectifying elements are formed.

16. A semiconductor composite according to claim 15 wherein said plurality of films are so arranged that pattern recognition can be accomplished and, each of said films being positioned to receive the incoming light.

17. A semiconductor composite according to claim 1 wherein said tin oxide is substantially $SnO_2$.

* * * * *